UNITED STATES PATENT OFFICE.

WALTER GLAESER, OF FULLERTON, PENNSYLVANIA, ASSIGNOR, BY MESNE ASSIGN-MENTS, TO POTASH EXTRACTION CORPORATION, OF NEW YORK, N. Y., A CORPORATION OF NEW YORK.

METHOD OF TREATING FERROUS ALKALI SILICATES.

1,254,676.  Specification of Letters Patent.  Patented Jan. 29, 1918.

No Drawing.  Application filed March 9, 1917. Serial No. 153,723.

*To all whom it may concern:*

Be it known that I, WALTER GLAESER, a subject of the German Emperor, and a resident of Fullerton, county of Lehigh, and State of Pennsylvania, have invented a new and useful Improvement in Methods of Treating Ferrous Alkali Silicates, of which the following is a specification, the principle of the invention being herein explained and the best mode in which I have contemplated applying that principle, so as to distinguish it from other inventions.

The present invention, relating, as indicated, to a method of treating ferrous alkali silicates, is more particularly concerned with a method of so treating such silicates, and in particular greensand or glauconite, that the potash contained therein is rendered available for use as a fertilizer by being converted into a water soluble condition. To the accomplishment of the foregoing and related ends, said invention, then, consists of the means hereinafter fully described and particularly pointed out in the claims.

The following description sets forth in detail one approved method of carrying out the invention, such disclosed mode, however, constituting but one of the various ways in which the principle of the invention may be used.

Greensand is widely distributed over a number of States in the United States and very large deposits are found in Delaware and New Jersey which are available for convenient removal as they lie but a few feet under the surface in the ground and extend to great depths. This greensand is a very fine sand and contains from six to fourteen per cent. of potash in the form of an insoluble double silicate. I have found that the present method can be used to convert the insoluble potassium silicate in the greensand into a water-soluble salt in an extremely economical way.

The greensand is first ground to about the fineness of 100 mesh screen and may then be washed to remove the clay if this is desired, although it is not essential that the clay be removed before the greensand is treated. The finely ground greensand is then mixed with about sixty per cent. of its own weight of calcium chlorid and the mixture is dried at a temperature of about 270 degrees C. to drive off the moisture. In drying the calcium chlorid and greensand air must of course be excluded from the apparatus in order to prevent any possible decomposition of the calcium chlorid by the constituents of the air in the event that a temperature of 270° C. be exceeded. It is essential that the temperature be maintained at or below the point named, as a higher temperature is apt to cause oxidation of the ferrous iron in the greensand to a ferric state, which will prevent the most satisfactory results in the later steps of the process, as will be explained hereinafter. About five per cent. of finely divided coke is also added to the mixture of greensand and calcium chlorid before the same is dried for a mechanical reason, as this coke prevents the formation of lumps or balls in the mixture which are due to localized heating. There is no chemical reaction between the greensand and the calcium chlorid during this temporary heating or drying, and the only change that takes place is represented by the following equations.

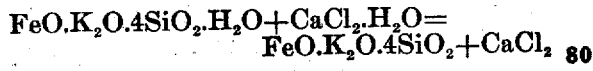

$$FeO.K_2O.4SiO_2.H_2O + CaCl_2.H_2O = FeO.K_2O.4SiO_2 + CaCl_2$$

The drying operation must be carried out without the conversion of the iron from the ferrous to the ferric state, as otherwise, the yield of potassium chlorid in the next step is decreased and the process requires more time, as well as the use of a contact substance. This oxidation of the iron may be prevented either by maintaining a low temperature as stated, or by excluding oxygen by heating in a closed chamber.

The ground and dried mixture of greensand and calcium chlorid is next heated for a period of about one-half hour at a temperature of about 800 degrees C. out of contact with oxygen; that is, in a non-oxidizing or reducing atmosphere. The reactions which take place between the greensand and the calcium chlorid during this heating may be represented as follows:—

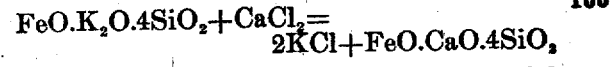

$$FeO.K_2O.4SiO_2 + CaCl_2 = 2KCl + FeO.CaO.4SiO_2$$

In carrying out this step on a commercial scale and in a large apparatus a small amount of air will leak in and the reaction of this small amount of air with the ferrous calcium silicate that is formed is as follows:—

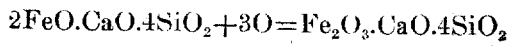

The greensand is particularly adapted for conversion with calcium chlorid into an iron calcium silicate and potassium chlorid, since the greensand contains iron in a ferrous state, and this ferrous iron acts as a contact substance to assist in the reaction between the calcium chlorid and the greensand. This is true only when the greensand has been preliminarily heated in the drying operation below a temperature at which the ferrous iron will be oxidized to the ferric state, and great care must be taken in the preliminary heating to prevent the oxidation of the iron from the ferrous to the ferric state. An additional advantage of having iron present in the mixture in a ferrous state is that it acts as a reducing agent to combine with any free oxygen which may leak into the apparatus in the manner indicated in the preceding equation. The coke which is added to the mixture before the drying operation to prevent the formation of lumps is also a reducing agent and assists in the maintenance of a non-oxidizing atmosphere in the chamber during the second heating, and prevents oxidation of the ferrous iron in the event that the temperature is allowed to rise too high in the drying step. If desired, brick dust or any finely divided porous substance may be used for the same mechanical purpose as the coke.

The action of the ferrous iron as a contact substance may be indicated by the following equations, and the extent of the reaction given below will depend upon the amount of air leakage:

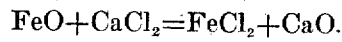

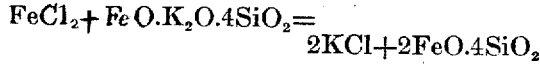

The free lime that is formed in the first of the above equations immediately enters the silicate, forming a basic silicate of the probable composition:

It is essential in carrying out the present process that the greensand be preliminarily heated, as well as the calcium chlorid to drive off all moisture for the reason that moisture will attack the calcium chlorid in the next step of the operation to form hydrochloric acid and calcium oxid. I have found that unless the moisture is expelled before the final heating the yield is reduced very materially and not more than fifty to seventy per cent. of the potash content is rendered available in the form of potassium chlorid. Similarly the last heating must be carried out either in the absence of oxygen or in the presence of substances which will combine with the oxygen before the oxygen can combine to any extent with the ferrous iron in the greensand, for the reason that if the iron in the greensand is changed to the ferric state it will not react readily with the calcium chlorid to produce potassium chlorid and ferrous calcium silicate. It is for this reason also that the preliminary heating must be carried out at a temperature which will not oxidize the ferrous iron in the greensand to the ferric state. If these precautions are taken the greensand furnishes a natural contact substance, which materially assists the reaction which forms potassium chlorid and gives as high a yield of potassium as ninety-nine per cent. of the total potash content of the greensand.

I am aware that the amount of calcium chlorid and greensand is far in excess of the amount of calcium chlorid required to combine mechanically according to the above formulas, but I have found that if the calcium chlorid is used to an extent equal to this chemical combining weight that the entire amount of potassium is not reacted upon, and the yield is materially cut down, and thus in commercial practice it is desirable that a considerable excess of calcium chlorid be used. It may be noted that the formula for greensand herein given is probably only approximately correct and this formula and the reaction equations may vary for greensand from different deposits, although experiments have indicated that these equations are approximately correct so far as the applicant can determine.

Other modes of applying the principle of my invention may be employed instead of the one explained, change being made as regards the process herein disclosed, provided the step or steps stated by any one of the following claims or the equivalent of such step or steps be employed.

I therefore particularly point out and distinctly claim as my invention:—

1. In a method of treating ferrous alkali silicates, the step which consists in heating a mixture of anhydrous calcium chlorid and anhydrous ferrous alkali silicate in a non-oxidizing atmosphere at a temperature of about 800° C.

2. In a method of treating ferrous alkali silicates, the step which consists in heating a mixture of anhydrous calcium chlorid and anhydrous ferrous alkali silicate in a non-oxidizing atmosphere at a temperature of about 800° C. for about one-half hour.

3. In a method of treating ferrous alkali silicates, the step which consists in heating a mixture of anhydrous calcium chlorid and anhydrous ferrous alkali silicate in a closed chamber at a temperature of about 800° C.

4. In a method of treating ferrous alkali silicates, the steps which consist in drying a mixture of finely divided ferrous alkali silicate and calcium chlorid at a temperature insufficient to oxidize the ferrous iron present, and then heating such dried mixture in a non-oxidizing atmosphere at a temperature of about 800° C.

5. In a method of treating ferrous alkali silicates, the steps which consist in drying a mixture of finely divided ferrous alkali silicate and calcium chlorid at not over 270° C. and then heating such dried mixture in a non-oxidizing atmosphere at a temperature of about 800° C.

6. In a method of treating ferrous alkali silicates, the steps which consist in drying a mixture of finely divided ferrous alkali silicate and calcium chlorid at not over 270° C. and then heating such dried mixture in a closed chamber at about 800° C.

7. In a method of treating ferrous alkali silicates, the steps which consist in drying a mixture of finely divided ferrous alkali silicate and calcium chlorid in the proportions of about five to three respectively by weight at a temperature of not over 270° C., and then treating such dried mixture in a non-oxidizing condition at a temperature of about 800° C.

8. In a method of treating ferrous alkali silicates, the steps which consist in heating a mixture of finely divided ferrous alkali silicate and calcium chlorid with a finely divided porous material at a temperature sufficient to drive off the moisture and combined water, but insufficient to oxidize the ferrous iron present, and then heating such dried mixture in a non-oxidizing atmosphere at a temperature of about 800° C.

9. In a method of treating ferrous alkali silicates, the steps which consist in heating a mixture of finely divided ferrous alkali silicate and calcium chlorid with finely divided coke at a temperature sufficient to drive off the moisture and combined water, but insufficient to oxidize the ferrous iron present, and then heating such dried mixture in a non-oxidizing atmosphere at a temperature of about 800° C.

10. In a method of treating ferrous alkali silicates, the steps which consist in drying a mixture of calcium chlorid and ferrous alkali silicate under non-oxidizing conditions and then heating such dried mixture in a non-oxidizing atmosphere at about 800° C.

11. In a method of treating ferrous alkali silicates, the steps which consist in drying a mixture of calcium chlorid and ferrous alkali silicate and preserving the iron of such silicate in a ferrous condition, and then heating such dried mixture in a non-oxidizing atmosphere at about 800° C.

Signed by me, this 6th day of March, 1917.

WALTER GLAESER.